United States Patent
Pearl, Jr. et al.

(10) Patent No.: US 11,352,547 B2
(45) Date of Patent: Jun. 7, 2022

(54) WELLBORE TREATMENT FLUIDS WITH NO-HEAT LIQUID SOLDER ADDITIVES

(71) Applicant: Halliburton Energy Services, Inc., Houston, TX (US)

(72) Inventors: William Cecil Pearl, Jr., Spring, TX (US); Samuel J. Lewis, Spring, TX (US); Simon David Turton, Kingwood, TX (US)

(73) Assignee: Hallburton Energy Services, Inc., Houston, TX (US)

(*) Notice: Subject to any disclaimer, the term of this patent is extended or adjusted under 35 U.S.C. 154(b) by 34 days.

(21) Appl. No.: 16/746,485

(22) Filed: Jan. 17, 2020

(65) Prior Publication Data
US 2021/0222047 A1   Jul. 22, 2021

(51) Int. Cl.
| | |
|---|---|
| *E21B 33/138* | (2006.01) |
| *C09K 8/516* | (2006.01) |
| *C09K 8/508* | (2006.01) |
| *E21B 21/00* | (2006.01) |
| *C09K 8/504* | (2006.01) |

(52) U.S. Cl.
CPC ............. *C09K 8/516* (2013.01); *C09K 8/508* (2013.01); *C09K 8/5045* (2013.01); *E21B 21/002* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 4,232,741 A * | 11/1980 | Richardson | C09K 8/94 166/281 |
| 10,266,925 B2 | 4/2019 | Thuo et al. | |
| 2003/0058127 A1 | 3/2003 | Babour et al. | |
| 2004/0007389 A1 | 1/2004 | Zupanick | |
| 2004/0104045 A1 | 6/2004 | Larovere | |
| 2006/0037748 A1 | 2/2006 | Wardlaw et al. | |
| 2006/0144591 A1* | 7/2006 | Gonzalez | E21B 33/13 166/277 |
| 2008/0060811 A1* | 3/2008 | Bour | C04B 26/04 166/291 |
| 2009/0229494 A1 | 9/2009 | Shah et al. | |
| 2012/0247765 A1 | 10/2012 | Agrawal et al. | |
| 2015/0198009 A1* | 7/2015 | Bexte | E21B 29/002 166/290 |
| 2016/0137912 A1 | 5/2016 | Sherman et al. | |

(Continued)

FOREIGN PATENT DOCUMENTS

WO    2017011029    1/2017

OTHER PUBLICATIONS

PCT Application No. PCT/US2020/014155, International Search Report and Written Opinion, dated Oct. 7, 2020, 12 pages.

(Continued)

*Primary Examiner* — Charles R Nold
(74) *Attorney, Agent, or Firm* — Kilpatrick Townsend & Stockton LLP

(57) ABSTRACT

Treatment material for a wellbore operation can be mixed with a metal material coated with a layer that is controllably activated to release the metal material downhole in a wellbore. The wellbore treatment material can be mixed with the metal material prior to being positioned downhole in the wellbore.

19 Claims, 5 Drawing Sheets

(56) References Cited

U.S. PATENT DOCUMENTS

| | | |
|---|---|---|
| 2016/0258269 A1 | 9/2016 | Musso et al. |
| 2017/0014958 A1* | 1/2017 | Thou .................. B23K 35/3013 |
| 2017/0081956 A1 | 3/2017 | Ganguly et al. |
| 2017/0107419 A1 | 4/2017 | Roy et al. |
| 2018/0258735 A1 | 9/2018 | Shafer |
| 2018/0274333 A1 | 9/2018 | Gibb |

OTHER PUBLICATIONS

PCT Application No. PCT/US2020/014159, International Search Report and Written Opinion, dated Oct. 7, 2020, 13 pages.
PCT Application No. PCT/US2020/014161, International Search Report and Written Opinion, dated Oct. 15, 2020, 12 pages.
PCT Application No. PCT/US2020/014164, International Search Report and Written Opinion, dated Oct. 15, 2020, 12 pages.

* cited by examiner

WELLBORE TREATMENT FLUIDS WITH NO-HEAT LIQUID SOLDER ADDITIVES

TECHNICAL FIELD

The present disclosure relates generally to materials usable in a wellbore environment for completion processes. More specifically, this disclosure relates to wellbore treatment additives comprising metal material that can be controllably released in liquid form.

BACKGROUND

During completion of a well in a subterranean formation, casing may be added to the wellbore and cemented to seal and fix the casing in the wellbore. Perforations in the casing, cement, and formation may also be introduced during completion to enable efficient production of hydrocarbons from the formation.

Aside from cement, other wellbore treatment materials, such as polymers and resins, may be used, for sealing and fixing the casing in place within the wellbore or for other operations associated with completion. Lost-circulation material (LCM) may also be used to plug, seal, or isolate a lost-circulation zone in a formation.

DETAILED DESCRIPTION

Figure 1:
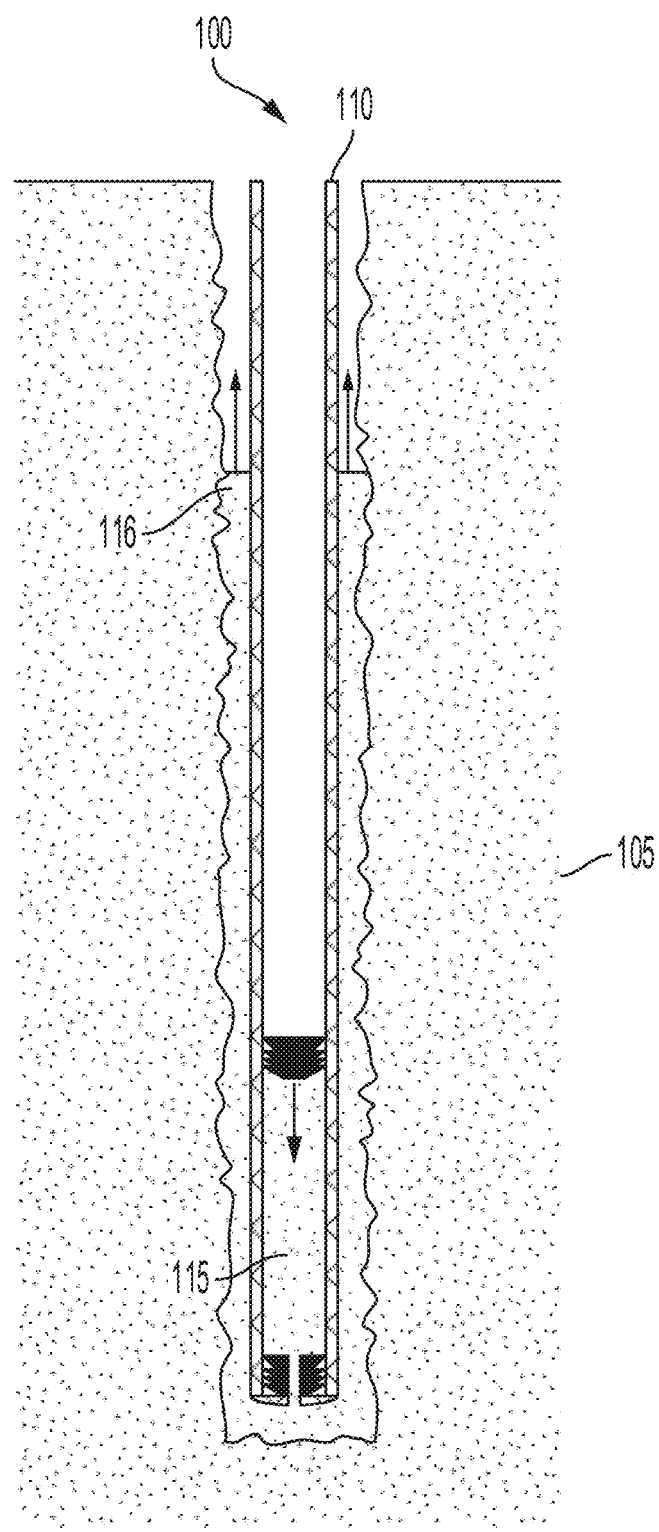
FIG. 1 is a schematic illustration depicting a wellbore completion operation according to one example of the present disclosure.

Certain aspects and examples of the present disclosure relate to wellbore completion using a mixture of a wellbore treatment material and a metal material coated with a layer allowing controlled activation to release the metal material within the wellbore. In some embodiments, the mixture may be positioned downhole in a wellbore and the wellbore treatment material may be cured while the metal material coated with the layer remains dormant until the layer is activated to release the metal material when needed. Wellbore completion may include processes associated with preparing a well in a subterranean formation for production of hydrocarbons. Examples of preparing the well for production include installing, sealing, or fixing a casing in place within the wellbore using a wellbore treatment material (e.g., cement or resin) or sealing or isolating lost-circulation zones. The metal material may comprise a metal or alloy that is in the liquid state prior to activation of the layer. The metal material may exist in an undercooled (sometimes referred to as a supercooled) liquid state because the presence of the coating layer can stabilize the metal material in the liquid state below its freezing/melting point. The layer can be controllably activated by breaking, dissolving, or otherwise disrupting the layer to allow the undercooled metal material in the liquid state to be released, after which it can solidify. Example techniques for activating the layer include, but are not limited to subjecting the layer to heat, ultrasonic energy, a magnetic field, an electric field, a compressive stress, a shear stress, or a chemical dissolution treatment.

Use of metal material coated with a layer that is controllably activated in a wellbore completion operation can lend a degree of a strength to a wellbore treatment material since the metal material can have a mechanical properties that are greater than the wellbore treatment material itself. As an example, the metal material can be incorporated into cement, improving the mechanical properties of the cement, such as tensile strength, by activating the layer to release liquid metal material that solidifies as solid metal material, and incorporating into the cement matrix the solid metal material that can bridge and fill pore spaces. In some cases, the metal material may be included in a mixture comprising a carrier fluid, such as a suspension of particles of the metal material in a carrier fluid, which may be or comprise a wellbore treatment material. The wellbore treatment material may be a fluid (e.g., a liquid or slurry mixture) and may be referred to as a wellbore treatment fluid. Example wellbore treatment fluids include cement slurries, liquid resin, spacer fluids, carrier fluids, etc. The wellbore treatment material may be a solid, which may be formed upon curing of a wellbore treatment fluid. Example solid wellbore treatment materials may include cured cement or cured resin. Particles of the metal material may have any suitable sizes, such as a diameter of from 3 nm to 10 μm, or any value within this range.

The metal material coated with a layer that is controllably activated can also or alternatively be useful for accommodating a volume contraction of a wellbore treatment material during curing, as the metal material can undergo a volume expansion during changing from the liquid state to the solid state. As an example, some expansion aids that are useful in cement may not function well in resin, since these cement and resin systems provide different environments (e.g., alkalinity, presence of water). However, the metal material can be useful in both resin and cement systems, since the metal material can be released by activating the layer during the curing process, for example by applying external pressure or by dissolving the coating layer using a chemical or component included in the resin or cement. The volume expansion of the metal material during solidification can counteract or accommodate shrinkage that can occur during curing of the resin, for example.

Including a metal material coated with a layer that is controllably activated in a wellbore treatment material can be useful for at least partially sealing damage that may be sustained by the wellbore treatment material or a wellbore completion device or component (e.g., a casing), as the layer can be activated when the damage occurs, releasing liquid metal material that can flow to the location of the damage and solidify to at least partially seal the damage. This can be useful for creation of self-healing cement or resin. In one example, when a downhole cement is damaged and cracks or voids form in cement, the metal material can be released upon being subjected to the forces that create the damage. The released metal material can flow to fill the cracks or voids. In addition, the volume expansion that occurs upon solidification of the metal material can help to fill the cracks or voids.

In some cases, a metal material coated with a layer that is controllably activated can be used for sealing lost-circulation zones or as a lost-circulation material enhancer. For example, the metal material coated with the layer that is controllably activated may be included in a mixture comprising lost-circulation material. Example materials useful for lost-circulation material include, but are not limited to, sand, shale, ground marble, bauxite, ceramic materials, glass materials, metal pellets, fibrous materials, high strength synthetic fibers, carbon fibers, cellulose flakes, wood, resins, polymer materials (crosslinked or otherwise), resilient graphitic carbon, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, composite materials, such as those comprising a binder and a filler material like silica, alumina, fumed carbon, carbon black, graphite, mica, titanium dioxide, meta-silicate, calcium silicate, kaolin, talc, zirconia, boron, fly ash, hollow glass microspheres, or solid glass, or any combination of these. As another example, particles of the metal material may coat a lost-circulation material. The metal material can be released downhole upon activation of the layer, such as within the wellbore or in a loss zone adjacent to the wellbore. For example, the layer can be activated and metal material can be released when the lost-circulation material begins to plug the loss zone. For example, the pressure gradient encountered at the loss zone can apply a strain on the layer, releasing the metal material. The metal material and lost-circulation material can form a metal-bonded, impermeable filter cake for stopping the losses. The metal material, once the layer is activated and the metal material is solidified, can effectively glue the lost-circulation materials together, enabling the plugging of a wide range of loss zone fracture sizes and increasing the strength of the lost-circulation material filter cake.

The metal material can be useful as a heavy weight liquid additive. For example, including the metal material in a mixture comprising a wellbore treatment material can also allow for control over a density or specific gravity of the mixture, since the metal material may have a specific gravity (e.g., from about 6.5 to about 8.5) that is higher than that of the wellbore treatment material (e.g., from about 0.5 to about 2.5), and also higher than that of other heavy weight additives that may be used (e.g., from about 3.5 to about 4.0). Use of high density wellbore treatment mixtures can be useful in a number of scenarios, including offshore wells.

Including the metal material in mixtures comprising wellbore treatment material can be useful for logging a location of the mixture downhole. For example, a location of the metal material can be traced using wireline tools, such as when cement bond logs are created. When the metal material is included in a cement, the cement bond logs can have improved resolution, due to the facile detectability of the metal material. In cases where the metal material is included in a lead cement, the metal material can provide an effective indicator of the top of cement (TOC).

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic illustration depicting a wellbore 100 in which a completion operation is occurring according to one example. Wellbore 100 can extend through various earth strata and can extend through or to a hydrocarbon bearing subterranean formation 105. Although wellbore 100 is depicted in FIG. 1 as substantially vertical, other orientations for sections of wellbore 100 can be used, including curved, angled, or substantially horizontal. Wellbore 100 includes a casing string 110. A mixture 115 is used to fix casing string 110 in place within wellbore 110 as part of a completion operation. As illustrated, mixture 115 is directed downhole within the casing string using a pair of wiper plugs to force mixture 115 into an annular space between the wellbore 100 and the casing string 110.

Mixture 115 can comprise a wellbore treatment fluid, such as a cement slurry, and metal material coated with a layer that is controllably activated within the wellbore 100. By including metal material within mixture 115, aspects of the above features can be achieved, as will be described in more detail below.

Although FIG. 1 shows a single casing string 110, multiple casing strings can be used within wellbore 100, such as a surface casing string, an intermediate casing string, or a production casing string. In some cases, a liner suspended from inside the bottom of another casing string may be used. Further, various mixtures 115 can be used for wellbore completion operations other than cementing a casing string 110 or for well drilling operations. As examples, resins and polymers may also be used in mixture 115, such as for lost circulation material, as part of a cement sheath, for remediating an existing cement sheath, or the like.

In some cases, the wellbore treatment material component of mixture 115 may contract during curing. As noted above, including a metal material coated with a layer that is controllably activated in mixture 115 may be useful for accommodating or otherwise counteracting the contraction of the wellbore treatment material during curing. For example, since the wellbore treatment material may contract during curing, this contraction may apply stress on the layer and activate the layer to release the metal material, which can then flow out from within the layer and solidify. In cases where the metal material undergoes an increase in volume as it solidifies, the contraction of the wellbore treatment material can be at least partially counteracted by the volume expansion of the metal material during solidification.

In some cases, the wellbore treatment material may heat up as it cures, which can activate the layer. In some cases, the wellbore treatment material may undergo a chemical change (e.g., a change in pH) as it cures, which can activate the layer. In some cases, the layer may be manually activated while the wellbore treatment material cures, such as by subjecting mixture 115 to heat, ultrasonic energy, or an electric field, or a magnetic field, to allow the solidified metal material to accommodate the volume change of the wellbore treatment material. The manual activation scheme can be constant (e.g., applying a constant heat flux or magnetic field or electric field, or holding the temperature constant) or can change over time (e.g., change the heat flux or magnetic field or electric field, or changing the temperature) as the wellbore treatment material cures.

Including metal material in mixture 115 may be useful for providing different physical properties to a wellbore treatment material. For example, the metal material may have a larger specific gravity than the wellbore treatment material, providing the mixture 115 with an overall larger specific gravity than the wellbore treatment material alone. The metal material may also have a larger tensile strength than the wellbore treatment material, and thus mixture 115 can be reinforced by including the metal material in the mixture 115 with the wellbore treatment material. For example, in some cases, the metal material, when included in a mixture 115 comprising concrete, can serve a similar function as steel rebar in a reinforced concrete structure.

Including metal material in mixture 115 may also allow for mixture 115 to be detected by wireline tools, as the metal material may be more easily detected than the wellbore treatment material, such as by using an electro/magnetic probe. This can allow for more robust and higher resolution cement bond logging. By including the metal material in the lead part 116 of mixture 115, this can also allow for locating the top of the mixture 115 in the annulus between the casing string 110 and the wellbore 100, such as by probing the mixture 115 from the interior of the casing string 110.

In some cases, a metal material and a wellbore treatment material may be mixable with one another. Such a configuration may refer to the ability of the metal material and the wellbore treatment material to form a mixture. For example, the metal material may be dispersable or suspendable in the wellbore treatment material, such that the metal material and the wellbore treatment material can form a mixture, such as a slurry, dispersion, or suspension. To facilitate mixing, the metal material may be in the form of small particles that can be surrounded by or suspended in the wellbore treatment material, which may itself comprise a fluid (e.g., a solution, slurry, or liquid phase material).

Figure 2:
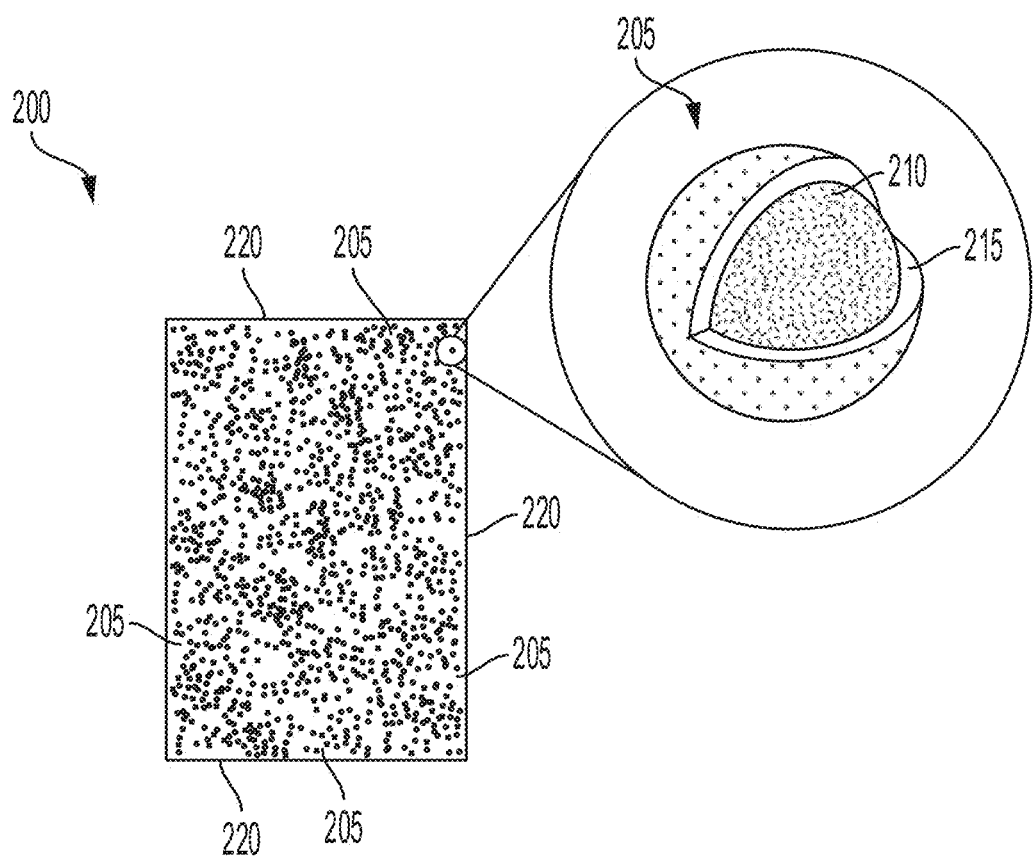
FIG. 2 is a schematic illustration of a mixture comprising a metal material according to one example of the present disclosure.

FIG. 2 is a schematic illustration of a mixture 200 comprising particles 205 of a metal material 210 according some examples of the present disclosure. Particles 205 may be described as having a core-shell particle structure with metal material 210 corresponding to a core and a layer 215 corresponding to a shell. The particles 205 of metal material 210 may be dispersed in, suspended in, or otherwise supported by a carrier fluid 220, which can be a wellbore treatment material. Metal material 210 may comprise a metal or alloy, in an undercooled liquid state, meaning that the metal material 210 in the particles 205 is a liquid, but is present at a temperature below the melting or solidus temperature of the metal material 210. Any suitable metal or alloy may be useful as the metal material 210, such as those metals or alloys having a melting or solidus temperature of less than about 100° C., less than about 200° C., or less than about 300° C. Optionally, a useful metal or alloy has a melting or solidus temperature greater than the temperature of a subterranean formation. In some examples, useful alloys include, but are not limited to, solder alloys, Field's metal (a eutectic alloy of bismuth, indium, and tin), Wood's metal (a eutectic alloy of bismuth, lead, tin, and cadmium), Cerrosafe (an alloy of bismuth, lead, tin, and cadmium), and Rose's metal (an alloy of bismuth, lead, and tin). Other alloys may be used, such as alloys comprising, consisting of, or consisting essentially of one or more of bismuth, lead, tin, indium, cadmium, thallium, gallium, zinc, copper, silver, gold, or antimony. Eutectic alloys comprising one or more of bismuth, lead, tin, indium, cadmium, thallium, gallium, zinc, copper, silver, gold, or antimony may also be used. Metals and alloys with melting temperatures as high as 500° C. can be used in some embodiments.

As shown in the inset in FIG. 2, the particles 205 of the metal material 210 may include a layer 215, which is schematically depicted in a partial cutaway view to show metal material 210 within layer 215. Layer 215 may be used as a stabilization layer or provide a stabilization effect, allowing metal material 210 to exist in the liquid state at temperatures below a melting or solidus temperature of metal material 210. Layer 215 may comprise one or more of a metal oxide, a chelated stabilizer, an organic adlayer, an inorganic adlayer, or an organic functional group. Example adlayers or functional groups that may be present on a surface of layer 215 may comprise acetate or phosphate. A specific example of layer 215 may comprise a metal oxide, such an oxide of the metal or alloy comprising the metal material 210 (e.g., a self-passivating oxide layer), optionally formed in-situ on the liquid metal material 210. The layer may include a chelated organic stabilizer on the surface thereof, such as a chelated acetate outer shell layer.

Particles of a metal material coated with such a layer may be generated by using a metal droplet emulsion technique. As an example, an amount of a liquid metal at a temperature above its melting or solidus point can be immersed in a dilute acid solution, such as a solution of ~2-5% acetic acid in diethylene glycol, and a rotating implement can be inserted into the mixture and rotated to generate a shearing force that separates small droplets, corresponding to particles 205, of the liquid metal which are coated with an oxide layer with a chelated stabilizing layer. The oxide layer and chelated stabilizing layer can serve to isolate the liquid metal from contacting nucleation sites, trapping the liquid metal in a metastable liquid state. Metals with higher melting temperatures can be used when the solution has suitable properties so that the solution stays in liquid form at the melting temperature of the metal. As examples, polyphenyl ether pump fluid or a variety of ionic liquids can be used, as these materials can have boiling temperatures as high as 500° C. or more. The resultant particles 205 can have any suitable dimensions. For example, particles 205 can have a diameter of from 3 nm to 10 μm, or any value within this range. Optionally, the particles 205 can be removed from the emulsion and concentrated to create large volumes of metal material in the form of particles 205. Optionally, the particles 205 can be suspended or dispersed in carrier fluid 220, which may be the same as the solution in which the particles 205 are created or may be a different fluid.

The layer 215, such as an oxide layer and chelated stabilizing layer, can be controllably activated to allow the metal material 210 inside to be controllably released in a liquid state, from which the metal material 210 can flow and then undergo a transformation to a solid state. Activation of layer 215 may include subjecting layer 215 to conditions that disrupt the oxide or chelated stabilizer, such as through mechanical or physical disruption or chemical or other dissolution. Example techniques for activating or controllably activating layer 215 include, but are not limited to, subjecting layer 215 to heat, ultrasonic energy, a magnetic field, an electric field, a compressive stress, a shear stress, or a chemical dissolution treatment. Advantageously, activation of layer 215 does not require the use of heat to allow metal material 210 to be in the liquid state upon activation, though heat may optionally be used to activate layer 215. Stated another way, since metal material 210 is already in the liquid state within layer 215, by disrupting layer 215, metal material 210 can be released in a liquid state without using heat to melt metal material 210 from a solid state to a liquid state. Further, layer 215 can be activated under ambient conditions or conditions within a wellbore or a formation, to release the metal material 210 in the liquid state.

Mixture 200 may also comprise a carrier fluid 220. For example, carrier fluid 220 may optionally comprise the continuous phase of the emulsion in which the particles 205 are created (e.g., a solution comprising ethylene glycol, an ionic liquid, a polyphenyl ether pump fluid) or another solvent (e.g., water, ethanol, methanol, a liquid hydrocarbon, etc.). Optionally, carrier fluid 220 is itself a mixture. For use in downhole operations in a wellbore, carrier fluid may optionally comprise, for example, an uncured cement or cement slurry, an uncured resin, an uncured polymeric material, a polymer precursor, a drilling mud, a spacer fluid, lost-circulation material, oil-based mud, water-based mud, or the like. Some carrier fluids may cure, change form, or otherwise change state as a function of time, such as curing of a cement to form cured cement, curing of a resin to form cured resin, or curing of a polymeric material or polymerization of a polymer precursor to form a cured polymeric material. In some cases, carrier fluid 220 may facilitate the activation of layer 215, such as by transferring heat, applying stress or strain, or transferring ultrasonic energy, for example.

A concentration of the metal material 210 or particles 205 in mixture 200 may vary depending on the particular application, and concentrations of from 5% by weight to 95% by weight may be used. Other example concentrations (percent by weight) of metal material 210 or particles 205 in mixture 200 include, but are not limited to, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, from 10% to 90%, from 10% to 40%, from 60% to 90%, etc.

In some cases, metal material 210 or particles 205 may settle out of carrier fluid 220, such as over time due to gravity. Metal material 210 or particles 205 may have a density or specific gravity that is higher than that of carrier fluid 220. In such a case, the mixture 200 can have an overall density or specific gravity that is higher than the carrier fluid without metal material 210 or particles 205. In some examples, a specific gravity for mixture 200 may range from 3 to 12. The specific gravity for mixture 200 can be a function of the composition of metal material 210, the composition of carrier fluid 220, and the concentration of metal material 210 in carrier fluid 220, for example.

Figure 3:
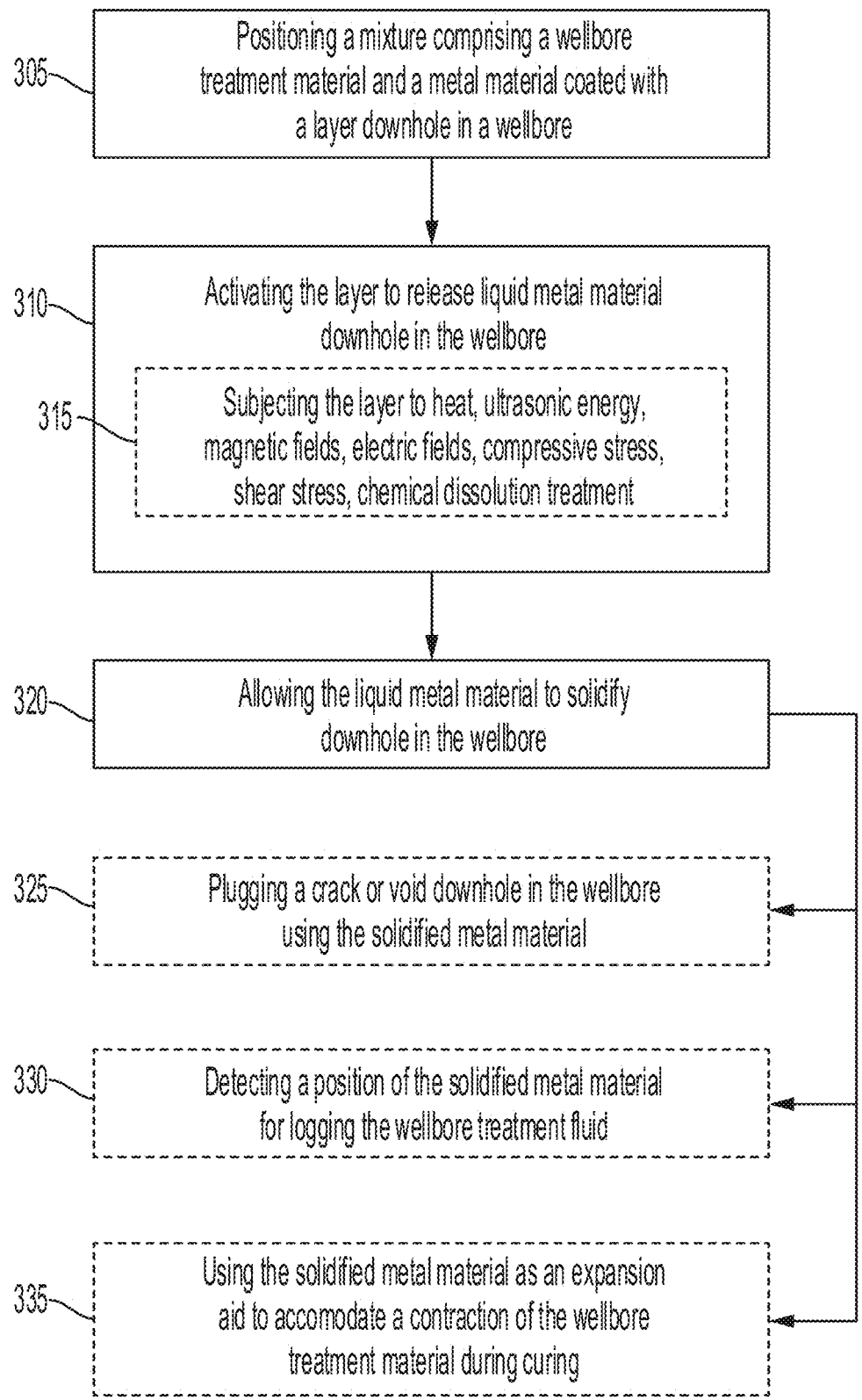
FIG. 3 is a flowchart providing an overview of an example of a method according to the present disclosure.

FIG. 3 is a flowchart providing an overview of an example method according to the present disclosure, such as a method for performing a wellbore completion operation. At block 305, a mixture comprising a wellbore treatment material and a metal material coated with a layer is positioned downhole in a wellbore. The mixture may comprise any of the mixtures described herein, such as mixture 115 or 200. The metal material may comprise any metal material described herein, such as metal material 210. The metal material may be in the form of or comprise particles, such as particles 205 in which metal material 210 is coated with layer 215. The metal material coated with the layer may be in a liquid state prior to being positioned downhole in the wellbore. The wellbore treatment material may be any suitable wellbore treatment material, such as wellbore treatment materials described herein (e.g., cured or uncured cements, resins, polymers, polymer precursors, etc.). The wellbore treatment material may correspond to or comprise a carrier fluid for positioning the metal material downhole in the wellbore. Example treatment materials comprise cement slurries, uncured resins, uncured polymers or polymer precursors, or the like.

At block 310, the layer can be activated to release the metal material in a liquid state downhole in the wellbore. Activation of the layer can be useful for performing, or assisting the wellbore treatment material in performing, a wellbore treatment or completion operation. Non-limiting examples of techniques for activating the layer include subjecting the layer to one or more of heat, ultrasonic energy, magnetic fields, electric fields, compressive stress, shear stress, or chemical dissolution treatment, as shown in block 315.

At block 320, the metal material is allowed to solidify downhole in the wellbore. As described above, the layer may allow the metal material to exist in a supercooled or undercooled condition in the mixture; that is, the metal material can be in a liquid form even though its temperature is less than the metal material's melting or solidus temperature. Upon activating the layer and releasing the metal material, the metal material can flow, in liquid form, for an amount of time and then the metal material may solidify, such as upon the metal material contacting another substance or object, which may initiate crystallization of the metal material in solid form.

Non-limiting or optional uses of the metal material in the solid state include those described above. For example, and as shown in block 325, activation of the layer can be useful for sealing damage to the wellbore treatment material, such as by allowing the metal material to fill voids or cracks downhole, such as in the wellbore treatment material.

Optionally, and as shown in block 330, a spatial position of the metal material may detected, such as by using a wireline tool and used to identify a position of the wellbore treatment material or in a process of preparing a cement-bonding log. By including the metal material in only a selective portion of the wellbore treatment material, the portion may be easily identified and distinguished from other portions. As one example, by including the metal material in a lead cement used for cementing a casing string, the location of the top of the cement may be identified by way of detection of the metal material. In some cases, the metal material may be more strongly and easily detected than the wellbore treatment material, which can allow for higher resolution cement bond logs.

Optionally, and as shown in block 335, the solidified metal material can also serve as an expansion aid to accommodate a contraction of the wellbore treatment material during curing. Some wellbore treatment materials, like resin, may contract during curing and so by including metal material that expands at it solidifies, a volume expansion of the solidifying metal material can at least partially counter-act a volume contraction of the curing resin.

Figure 4:
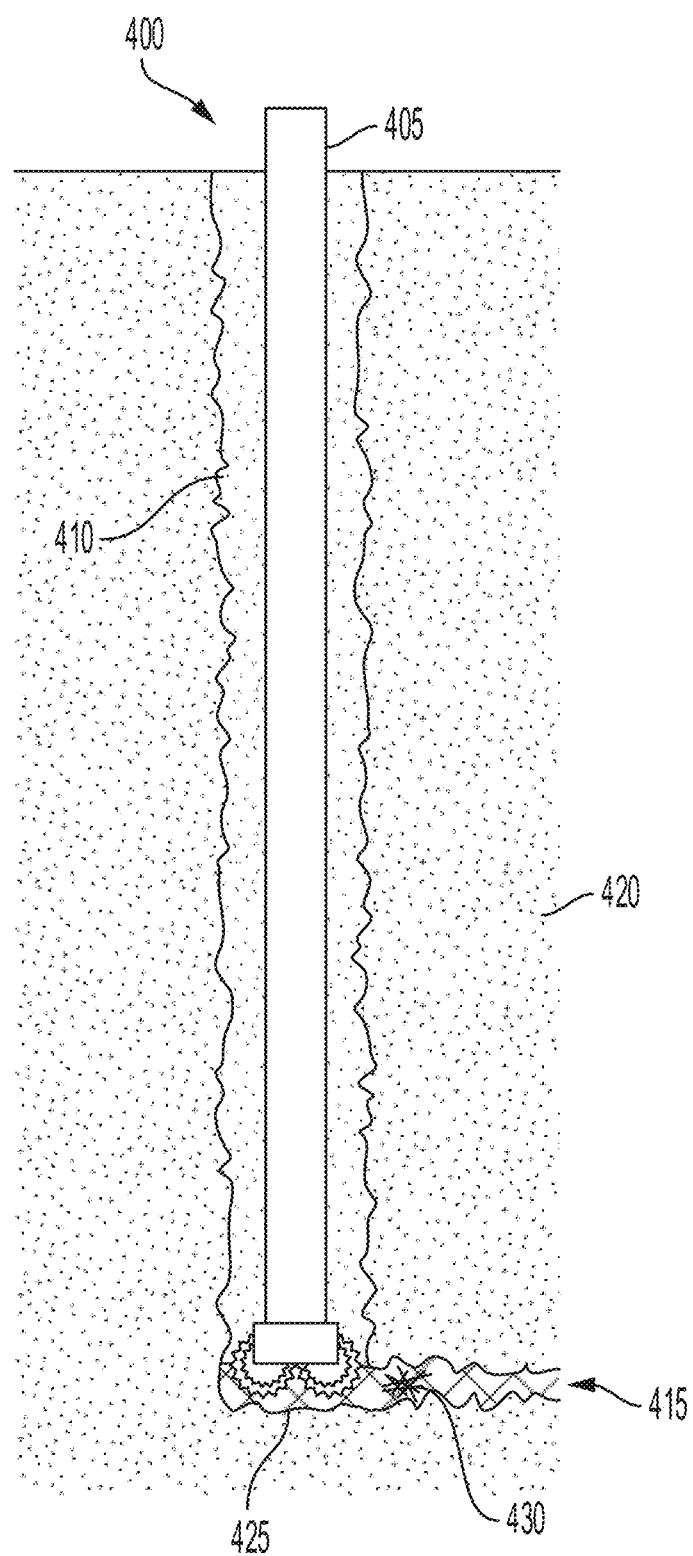
FIG. 4 is a schematic illustration depicting isolation of a lost-circulation zone in a formation according to one example of the present disclosure.

FIG. 4 is a schematic illustration depicting isolation of a lost-circulation zone in a subterranean formation according to one example of the present disclosure. FIG. 4 shows a wellbore 400 with a drilling string 405, drilling mud 410, and a loss zone 415 in formation 420. To isolate the loss zone 415, a mixture 425, such as a mixture comprising a wellbore treatment material and a metal material coated with a layer, can be introduced downhole by the drilling string 405. In this case, the mixture 425 can enter the loss zone 415, and the lost-circulation material and metal material can fill and plug the loss zone to isolate the loss zone 415 from the wellbore 400.

As the lost-circulation material begins to form a filter cake 430, a layer coating the metal material can be activated, releasing liquid metal material that can flow to bind the lost-circulation material and strengthen, reinforce, and solidify the filter cake 430. For example, by subjecting the layer to a pressure differential within loss zone 415, the layer can be ruptured to release the metal material, which can then coat and join elements of the lost-circulation material to grow and reinforce the filter cake 430. As the filter cake 430 grows and seals the loss zone 415, the flow of mixture 425 through fluid pathways around and through the filter cake can subject the mixture to forces that can activate the layer to release additional metal material in those fluid pathways, further growing and filling the loss zone 415 to isolate the loss zone from the wellbore 400.

Figure 5:
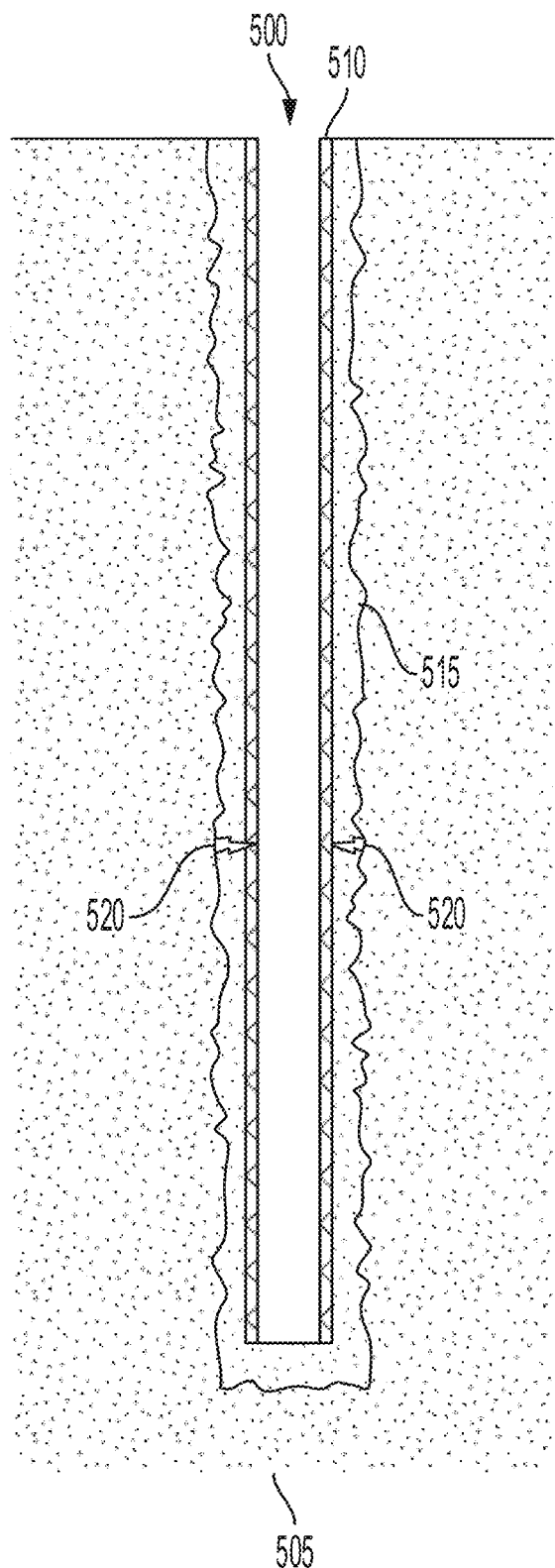
FIG. 5 is a schematic illustration of wellbore having damage to a casing and cementing.
Figure 6:
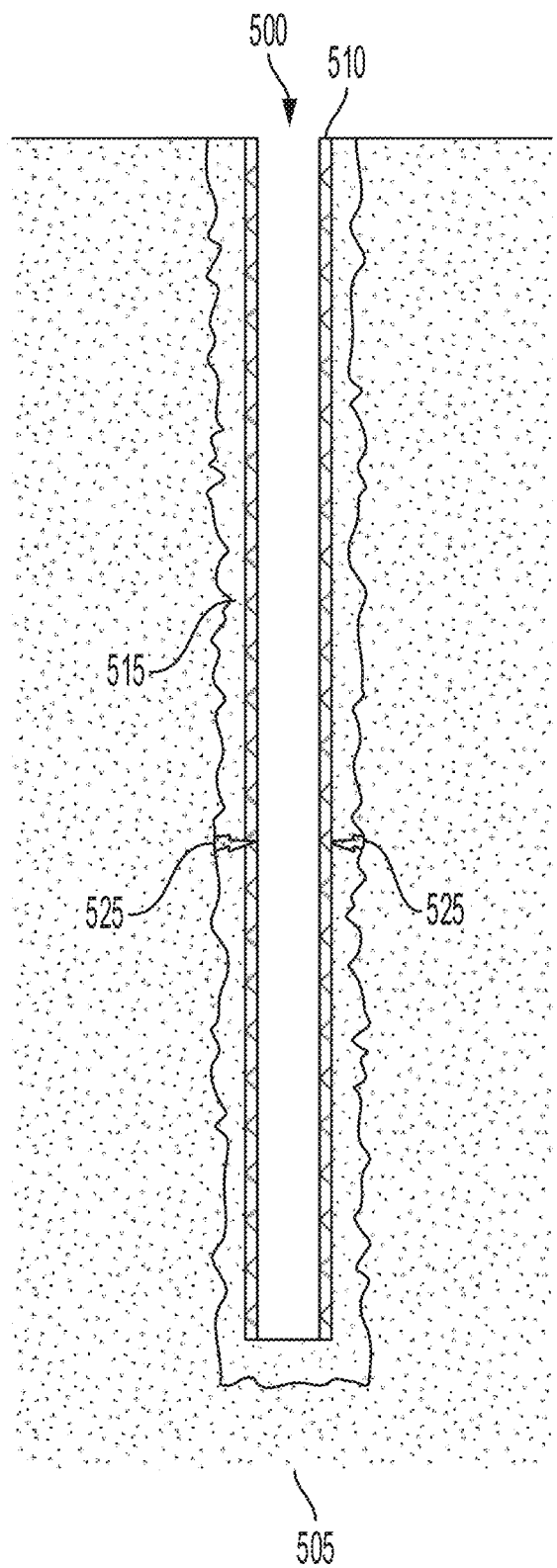
FIG. 6 is a schematic illustration of a wellbore in which the damage to the casing and cementing is sealed by metal material in the cementing according to one example of the present disclosure.

FIG. 5 and FIG. 6 provide schematic illustrations of wellbore 500 in a subterranean formation 505. A casing string 510 and cementing 515 are depicted within wellbore 500. Cementing 515 can comprise any suitable wellbore treatment mixture, and may comprise, for example, a mixture of cement, which is allowed to cure, and metal material coated with a layer that is controllably activated.

In FIG. 5, damage 520 is shown to casing string 510 and cementing 515. In various examples, damage 520 can be to both casing string 510 and cementing 515 or only to one of casing string 510 or cementing 515. Damage 520 can occur for any of a variety of conditions, such as shifting with subterranean formation 505. Damage 520 can correspond to a crack or a void within casing string 510 and cementing 515, for example.

When damage 520 occurs, the layer coating the metal material in the cementing 515 can be activated, releasing the metal material. The released metal material, in liquid state can flow into and fill the damage 520 to form a seal 525, as depicted in FIG. 6. Although damage 520 is shown as vacant in FIG. 5, as damage 520 occurs, the layer coating metal material can be activated immediately or substantially immediately, filling the damage 520 with liquid metal material that can solidify to form seal 525 of solid metal material, to result in the configuration shown in FIG. 6. In some cases, the metal material can expand as it solidifies, at least partially aiding in filling cracks or voids corresponding to damage 520.

In some aspects, mixtures, methods, and materials for wellbore completion operations are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: positioning a mixture downhole in a wellbore, the mixture comprising: a metal material coated with a layer; and a wellbore treatment material; and activating the layer to release the metal material downhole in the wellbore for performing, or assisting the wellbore treatment material in performing, a wellbore treatment operation.

Example 2 is the method of example 1, wherein the metal material coated with the layer is in a liquid state prior to being released to form a solid state downhole in the wellbore, and wherein activating the layer comprises subjecting, at a downhole location, the layer to heat, ultrasonic energy, a magnetic field, an electric field, a compressive stress, a shear stress, or a chemical dissolution treatment to release the metal material in the liquid state into the wellbore.

Example 3 is the method of examples 1-2, wherein the wellbore treatment material comprises a cured cement, an uncured cement, a cured polymeric material, an uncured polymeric material or polymer precursor, a cured resin, or an uncured resin.

Example 4 is the method of examples 1-3, wherein the wellbore treatment material comprises cement or resin and wherein: the metal material has a tensile strength greater than a tensile strength of the wellbore treatment material; or activating the layer releases the metal material to seal damage to the wellbore treatment material; or the metal material is an expansion aid for accommodating a volume contraction of the wellbore treatment material upon curing.

Example 5 is the method of examples 1-4, wherein the wellbore treatment material comprises lost-circulation material, and wherein activating the layer releases the metal material to generate a metal-bonded filter cake comprising the lost-circulation material and the metal material for plugging a loss zone in the wellbore.

Example 6 is the method of examples 1-5, wherein the wellbore treatment material is cement, and wherein activating the layer releases the metal material in the wellbore for traceably assessing a cement bond formed by the wellbore treatment material.

Example 7 is the method of examples 1-6, wherein the metal material comprises particles of the metal material in an undercooled liquid state coated with the layer, wherein the layer comprises one or more of a metal oxide layer, an organic adlayer, an inorganic adlayer, or an organic functional group, wherein the particles are dispersed in, suspended in, or supported by the wellbore treatment material, and wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

Example 8 is a mixture comprising: a metal material coated with a layer that is controllably activatable in a wellbore to release the metal material; and a wellbore treatment material mixable with the metal material prior to the mixture being positioned downhole in the wellbore.

Example 9 is the mixture of example 8, wherein the metal material coated with the layer is in a liquid state and is controllably releasable from the layer to form a solid state in the wellbore, and wherein the layer is controllably activatable by subjecting, at a downhole location, the layer to heat, ultrasonic energy, a magnetic field, an electric field, a compressive stress, a shear stress, or a chemical dissolution treatment to release the metal material in the liquid state into the wellbore.

Example 10 is the mixture of examples 8-9, wherein the wellbore treatment material comprises a cured cement, an uncured cement, a cured polymeric material, an uncured polymeric material or polymer precursor, a cured resin, or an uncured resin, and wherein the layer is controllably activatable to release the metal material for performing, or assisting the wellbore treatment material in performing, a wellbore treatment operation.

Example 11 is the mixture of examples 8-10, wherein the wellbore treatment material comprises cement or resin and wherein: the metal material has a tensile strength greater than a tensile strength of the wellbore treatment material; or the layer is controllably activatable after the wellbore treatment material cures, and wherein the metal material is releasable to seal damage to the wellbore treatment material; or the metal material is an expansion aid for accommodating a volume contraction of the wellbore treatment material upon curing.

Example 12 is the mixture of examples 8-11, wherein the wellbore treatment material comprises lost-circulation material, and wherein the layer is controllably activatable to release the metal material to generate a metal-bonded filter cake comprising the lost-circulation material and the metal material for plugging a loss zone in the wellbore.

Example 13 is the mixture of examples 8-12, wherein the wellbore treatment material is cement, and wherein the layer is controllably activatable to release the metal material in the wellbore for being traceable to assess a cement bond formed by the wellbore treatment material.

Example 14 is the mixture of examples 8-13, wherein the metal material comprises particles of the metal material in an undercooled liquid state coated with the layer, wherein the layer comprises one or more of a metal oxide layer, an organic adlayer, an inorganic adlayer, or an organic functional group, wherein the particles are dispersed in, suspended in, or supported by the wellbore treatment material, and wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

Example 15 is a material comprising: a metal material; and a layer coated around the metal material, the layer being controllably activatable in a wellbore to release the metal material for performing, or assisting in performing, a wellbore treatment operation.

Example 16 is the material of example 15, wherein the metal material coated with the layer is in a liquid state and is controllably releasable from the layer to form a solid state in the wellbore, and wherein the layer is controllably activatable by subjecting, at a downhole location, the layer to heat, ultrasonic energy, a magnetic field, an electric field, a compressive stress, a shear stress, or a chemical dissolution treatment to release the metal material in the liquid state into the wellbore.

Example 17 is the material of examples 15-16, wherein the metal material is mixable with a wellbore treatment material comprising cement or resin and wherein: the metal material has a tensile strength greater than a tensile strength of the wellbore treatment material; or the layer is controllably activatable after the wellbore treatment material cures, and wherein the metal material is releasable to seal damage to the wellbore treatment material; or the metal material is an expansion aid for accommodating a volume contraction of the wellbore treatment material upon curing.

Example 18 is the material of examples 15-17, wherein the metal material is mixable with a wellbore treatment material comprising lost-circulation material, and wherein the layer is controllably activatable to release the metal material to generate a metal-bonded filter cake comprising the lost-circulation material and the metal material for plugging a loss zone in the wellbore.

Example 19 is the material of examples 15-18, wherein the metal material is mixable with a wellbore treatment material comprising cement, and wherein the layer is controllably activatable to release the metal material in the wellbore for being traceable to assess a cement bond formed by the wellbore treatment material.

Example 20 is the material of examples 15-19, wherein the metal material comprises particles of the metal material in an undercooled liquid state coated with the layer, wherein the layer comprises one or more of a metal oxide layer, an organic adlayer, an inorganic adlayer, or an organic functional group, and wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
positioning a mixture downhole in a wellbore, the mixture comprising:
particles comprising a metal material in an undercooled state coated with a layer that is controllably activatable to release the metal material in a liquid state in the wellbore; and
a wellbore treatment material; and
activating the layer to release the metal material in the liquid state from the particles downhole in the wellbore, wherein the metal material in the liquid state flows and solidifies to form solid metal material; and
performing a wellbore treatment operation using the solid metal material by filling or plugging a void or crack in the wellbore or in the wellbore treatment material.

2. The method of claim 1, wherein activating the layer comprises subjecting, at a downhole location, the layer to heat, ultrasonic energy, a magnetic field, an electric field, a compressive stress, a shear stress, or a chemical dissolution treatment to release the metal material in the liquid state into the wellbore.

3. The method of claim 1, wherein the wellbore treatment material comprises or is cured to form a cured cement, an uncured cement, a cured polymeric material, an uncured polymeric material or polymer precursor, a cured resin, or an uncured resin.

4. The method of claim 1, wherein the wellbore treatment material comprises uncured cement or resin, the method further comprising curing the uncured cement or resin to form cured cement or cured resin while the particles of the metal material in the undercooled state and coated with the layer are embedded in the wellbore treatment material, wherein the layer is activated upon being subjected to forces that create damage to the cured cement or cured resin, and wherein the wellbore treatment operation comprises the metal material flowing to a location of the damage to solidify and at least partly seal the damage.

5. The method of claim 4, wherein the cement comprises casing cement and wherein the damage includes damage to a casing string, the wellbore treatment operation comprising filling damage to the casing string with solidified metal material to form a seal.

6. The method of claim 1, wherein the wellbore treatment material comprises lost-circulation material, wherein the wellbore treatment operation comprises filling or plugging a loss zone in the wellbore using the mixture, and wherein activating the layer releases the metal material in the liquid state to generate a metal-bonded filter cake comprising the lost-circulation material and the solid metal material for filling or plugging the loss zone.

7. The method of claim 6, wherein activating the layer occurs by subjecting the layer to a pressure differential within the loss zone.

8. The method of claim 1, wherein the wellbore treatment material is cement for cementing a casing string, the method further comprising detecting a position of the metal material in the wellbore for creating a cement bond log.

9. The method of claim 8, wherein the wellbore treatment material comprises lead cement for cementing a portion of the casing string, the method further comprising detecting a position of the metal material for locating a top of cement.

10. The method of claim 1, wherein the layer comprises one or more of a metal oxide layer, an organic adlayer, an inorganic adlayer, or an organic functional group, wherein the particles are dispersed in, suspended in, or supported by the wellbore treatment material, and wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

11. The method of claim 1, wherein the metal material expands as it solidifies to at least partially fill the crack or the void.

12. The method of claim 1, wherein the metal material has a larger specific gravity than the wellbore treatment material.

13. The method of claim 1, wherein the mixture has specific gravity of from 3 to 12.

14. The method of claim 1, wherein the metal material has a larger tensile strength than the wellbore treatment material.

15. The method of claim 1, wherein the particles comprise 5% to 95% by weight of the mixture.

16. The method of claim 1, wherein the wellbore treatment material is a curable material.

17. The method of claim 16, wherein the curable material contracts upon curing, and wherein activating the layer occurs upon curing of the wellbore treatment material where contraction of the wellbore treatment material applies stress on the layer.

18. The method of claim 16, wherein activating the layer occurs after curing the wellbore treatment material.

19. The method of claim 16, further comprising curing the wellbore treatment material.

\* \* \* \* \*